Figure 1:
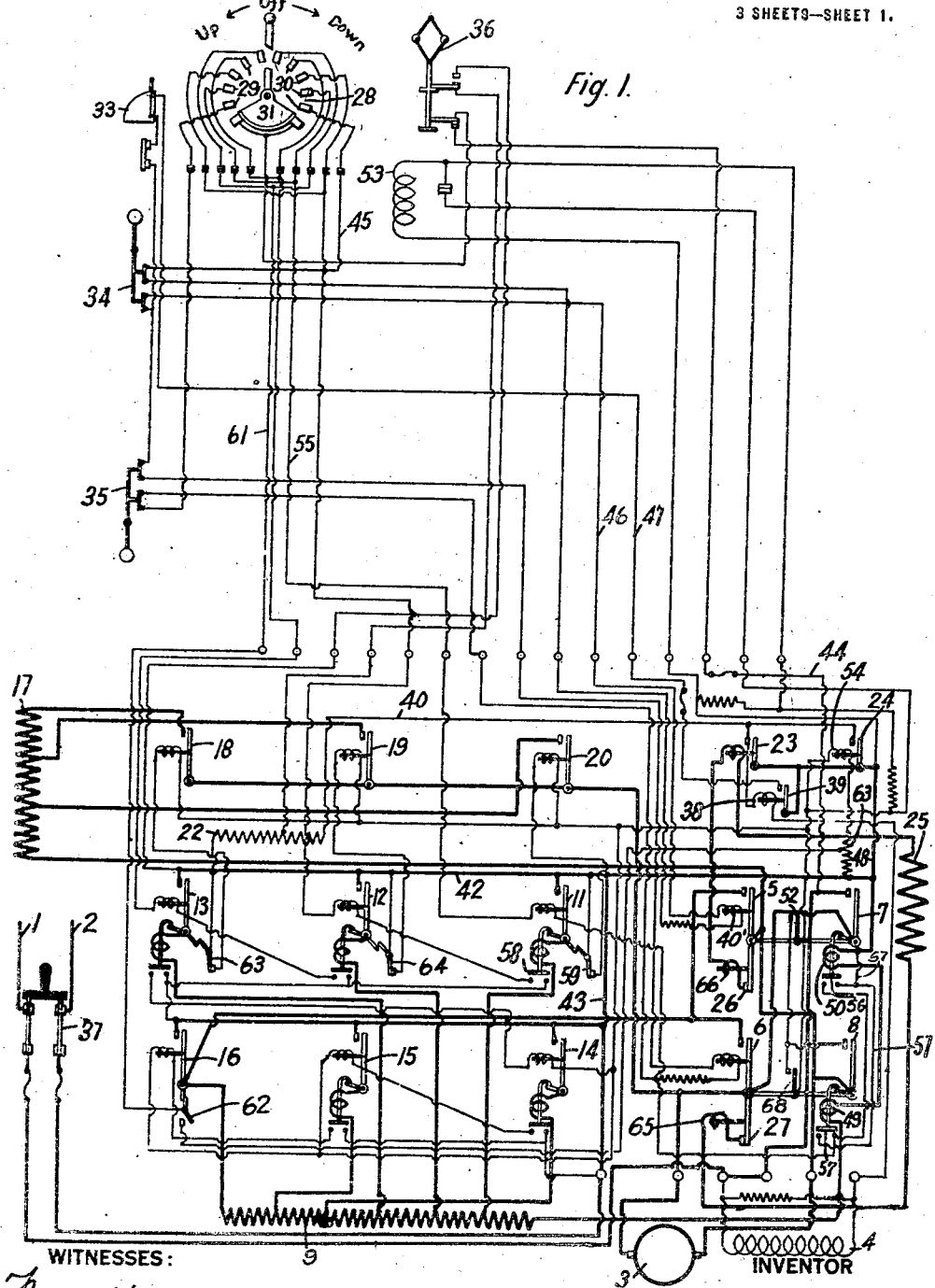

H. L. KEITH.
MOTOR CONTROL SYSTEM.
APPLICATION FILED MAY 14, 1915.

1,330,592.

Patented Feb. 10, 1920.
3 SHEETS—SHEET 1.

WITNESSES:

INVENTOR
Harold L. Keith
BY
ATTORNEY

| Sw. | Run up | | | | | Off | | Run Down | | | | |
|---|---|---|---|---|---|---|---|---|---|---|---|---|
| | 5 | 4 | 3 | 2 | 1 | BK. O BK | 1 | 2 | 3 | 4 | 5 |
| 6 | | | | | | | O | O O O O O O O O O O O |
| 5 | O O O O O O O O O O O | | | | | | | | | | |
| 8 | | | | | | | O O O O O O O O O O O O | | | | |
| 7 | O O O O O O O O O O O | | | | | | | | | | |
| 26 | | | | | | O | O | | | | |
| 27 | | | | | | O | O | | | | |
| 13 | O O O O O O | | | | | | | | | O O O O O O |
| 12 | O O O O O O O | | | | | | | | O O O O O O O |
| 11 | O O O O O O O O | | | | | | | O O O O O O O O |
| 18 | | | O O O O O | | | | O O O O O | | |
| 19 | | | | O O O O | | | | O O O O | | |
| 20 | | | | | O O | | | O O | | | |
| 14 | O O O O | | | | | | | | | | O O O O |
| 15 | O O O | | | | | | | | | | O O O |
| 16 | O O | | | | | | | | | | O O |
| 39 | O O O O O O O O O O O | | | | | | O O O O O O O O O O O | | | | |
| 24 | O O O O O O O O O O | | | | | | | O O O O O O O O O O | | | |
| 23 | | | | | | O | O | | | | |
| 68 | | | | | | | O O O O O O O O O O O | | | | |
| 52 | O O O O O O O O O O O | | | | | | | | | | |

WITNESSES:
C. Fornan
J. R. Langley.

INVENTOR
Harold L. Keith.
BY
Wesley Carr
ATTORNEY

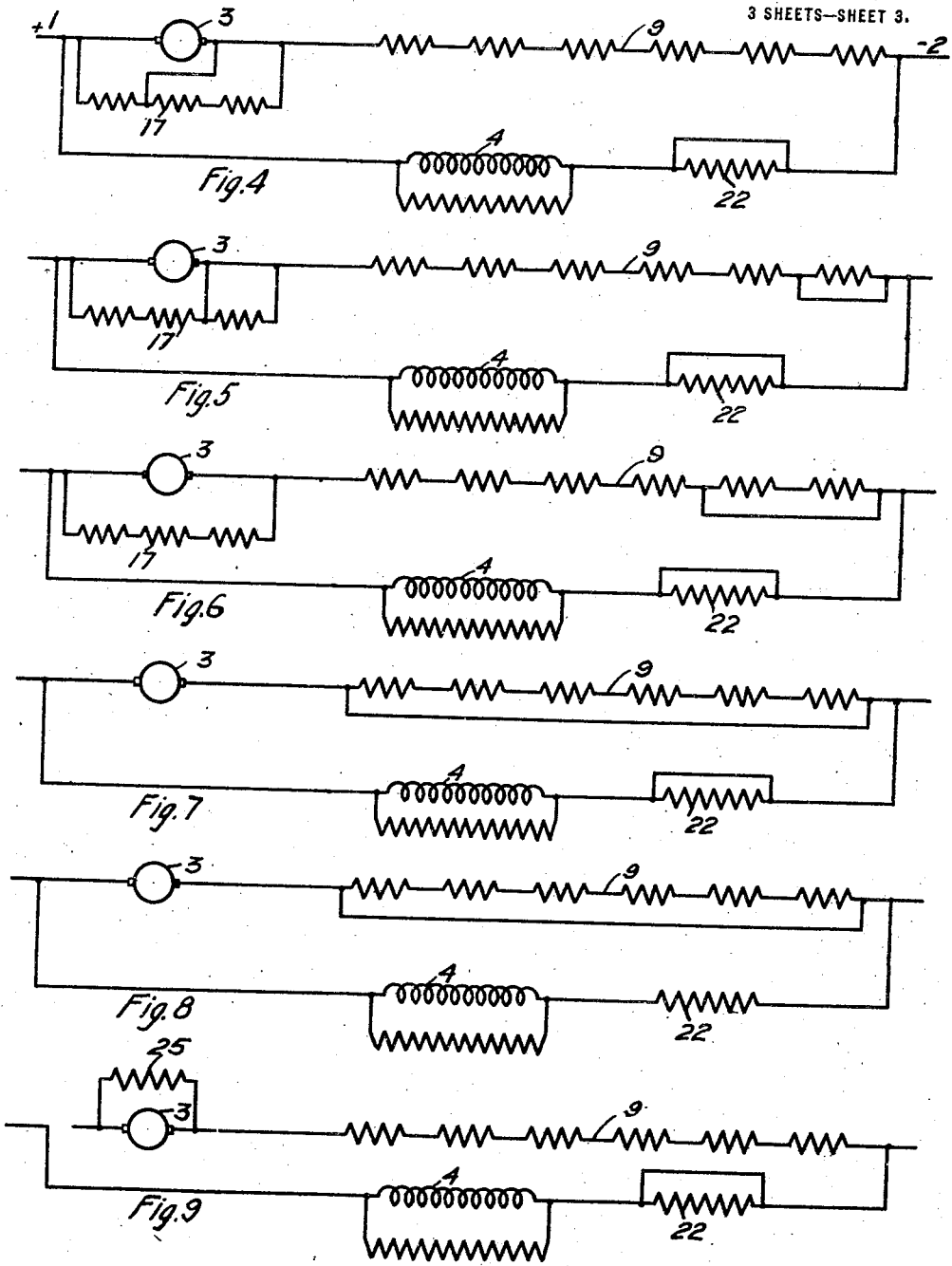

UNITED STATES PATENT OFFICE.

HAROLD L. KEITH, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

1,330,592.   Specification of Letters Patent.   Patented Feb. 10, 1920.

Application filed May 14, 1915. Serial No. 28,030.

*To all whom it may concern:*

Be it known that I, HAROLD L. KEITH, a citizen of the United States, and a resident of Edgewood Park, in the county of Allegheny and State of Pennsylvania, have invented a new and useful Improvement in Motor-Control Systems, of which the following is a specification.

My invention relates to motor-control systems, and particularly to such systems as embody means for automatically accelerating electric motors and for bringing the same to rest by means of dynamic braking.

My invention has for its object to provide a simple arrangement whereby an electric motor may be automatically and gradually accelerated upon the closing of its circuit and whereby said motor may be brought to rest quickly and safely by means of a graduated dynamic braking force.

My invention is particularly applicable to elevators, hoists and similar machines. In an installation of this character, it is often desirable that the control of the motor be as nearly automatic as possible in order that the variations in speed of the motor may be controlled in accordance with circuit conditions and that excessive strains and other damage caused by the improper use of manually operable controlling means may be avoided.

According to the present arrangement, the accelerating switches operate automatically to accelerate the motor in accordance with the current traversing the motor circuit simultaneously with the operation of the accelerating switches for shunting a resistor that is inserted in parallel with the motor armature. In bringing the motor to rest, dynamic braking is accomplished in gradual steps by means of the switches for controlling the parallel-connected resistor.

Figures 2, 3:
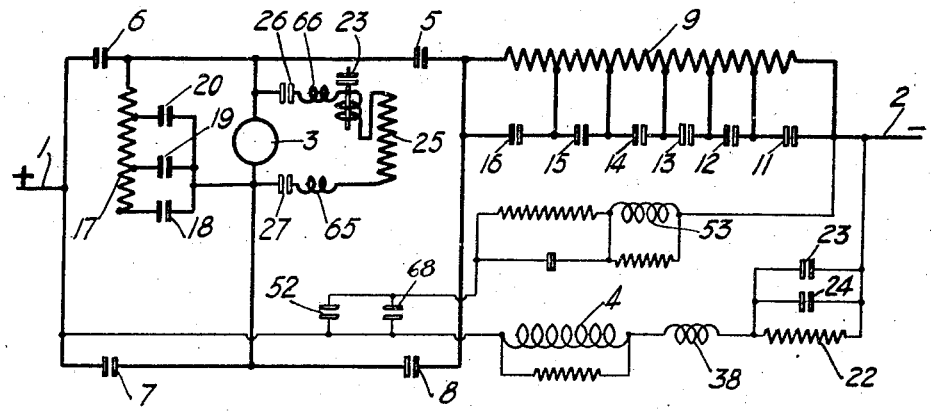

In the accompanying drawings, Figure 1 is a diagrammatic view of circuits and apparatus embodying my invention. Fig. 2 is a diagrammatic view of a schematic arrangement of the system of Fig. 1. Fig. 3 is a diagrammatic view indicating the sequence of the various switches. Figs. 4 to 9, inclusive, are diagrammatic views of the various circuits completed through the motor.

Line conductors 1 and 2, which may be connected to any suitable source of direct current, supply power to an electric motor 3 having a shunt field magnet winding 4. The motor 3 may be operatively connected, for example, to an elevator car. The direction of rotation of the motor 3 is controlled by reversing switches 5, 6, 7 and 8, the switches 5 and 7 and 6 and 8 being respectively mechanically connected in pairs.

A sectional starting resistor 9, which is in series with the motor 3, is controlled by a series of progressively actuated electromagnetic switches 11, 12, 13, 14, 15 and 16. A resistor 17, which is in parallel to the motor armature, is controlled by a series of electromagnetic switches 18, 19 and 20. A resistor 22, which is in circuit with the shunt field magnet winding 4, is controlled by relay switches 23 and 24. A dynamic braking circuit for the motor comprises a resistor 25 which is connected in a local circuit with the motor armature by switches 26 and 27 that are respectively connected to reversing switches 5 and 6.

The circuits of the actuating coils of the several electromagnetic switches are governed by a controller 28 which comprises a series of stationary contact members 29 and 30 and a movable contact segment 31 which successively engages the contact members 29 or 30, according to the direction in which the controller handle is actuated from its "off", or inoperative position. The system comprises also an emergency switch 33, which may be located in the elevator car, and limit switches 34 and 35 which may be located, respectively, at the top and the bottom of the elevator shaft.

A speed-controlled governor 36 operates to break the control circuit when the speed of the car or the motor 3 exceeds a predetermined rate. It may be noted, however, that the emergency switch 33, the limit switches 34 and 35, and the safety device 36 form no part of the present invention and detailed descriptions thereof are omitted as being unnecessary to an understanding of the system.

It may be assumed that the several electro-magnetic switches are in their inoperative positions and that a main switch 37 has been closed. The closing of the main switch 37 completes a circuit which extends from the positive line conductor 1, through the shunt field magnet winding 4, actuating coil 38 of a protective relay 39, conductor 40, shunt-field resistor 22, and conductors 42 and 43, to the negative line conductor 2. The protective relay 39 will then close to complete the control circuit and will remain in this position as long as the shunt field magnet winding is energized.

The controller arm may, in practice, be actuated quickly to either of the extreme limits of its path of movement, or it may be operated slowly, the results being substantially the same. In the present case, however, the operation will be described in the sequence produced by the step-by-step actuation of the controller to its several operative positions.

It may be assumed, for example, that the controller arm is actuated in a counter-clockwise direction to cause the movable contact segment to successively bridge the stationary contact members 30. In the first position of the controller, a circuit is completed which extends from the positive line conductor 1, through conductor 44, contact member 30, contact segment 31, contact member 30, conductor 45, limit switch 34, actuating coil 40' of reversing switch 5, conductor 46, limit switch 34, emergency switch 33, conductor 47, switch 39, conductors 48 and 43 to negative line conductor 2.

The coil 40' is energized to close the reversing switches 5 and 7 to establish the armature circuit for the motor which extends from the positive line conductor 1, through switch 7, motor armature, switch 5, resistor 9, coils 49 and 50, and conductor 43 to negative line conductor 2. A switch 52, which is mechanically connected to the reversing switches 5 and 7, closes a circuit for the releasing coil 53 of an electromagnetic brake and, at the same time, completes a circuit for the actuating coil 54 of the switch 24.

The switch 24 then closes to shunt the field resistor 22 and to thus insure a strong magnetic field in starting the motor. The closing of the switch 52 operates to complete a circuit for the actuating coils of the switches 18, 19 and 20 and the latter are simultaneously closed. The switch 18 connects the resistor 17 in parallel to the motor armature and the switches 19 and 20 close shunt circuits for corresponding sections of the resistor 17. When the several switches have operated as above described, the motor operates at its first running speed. The speed of the motor is then substantially uniform under varying loads because of the low-resistance shunt circuit through a section of the resistor 17. The circuit completed through the motor is illustrated in Fig. 4 of the drawing.

When the controller arm is actuated to its second position, a circuit is completed which extends from the movable contact segment 31, which is connected to the positive line conductor 1, through the contact member 30, conductor 55, actuating coil of the switch 11, current limit relay 56, which is then closed if the current has fallen to a predetermined value, and conductors 57 and 43 to negative line conductor 2.

The switch 11 is then closed to short circuit a section of the resistor 9 and, when the current traversing the motor circuit falls to a predetermined value, a relay switch 58, which is mechanically connected to the switch 11, closes to complete a circuit for the actuating coil of the switch 12 when the controller has been moved to its third operative position. The closing of the switch 11 operates a switch 59 that is mechanically connected thereto to open the circuit of the actuating coil of the switch 20 and the latter opens to insert a second section of the resistor 17 in parallel to the armature, as is illustrated in Fig. 5 of the drawing.

When the controller arm is actuated to its third position, a circuit is completed for the actuating coil of switch 12 and the latter closes to shunt a second section of the resistor 9. The closing of switch 12 operates to effect the opening of switch 19 in the same manner as that described in connection with switch 20, and the entire resistor 17 is then in circuit, as is illustrated in Fig. 6 of the drawing. When the controller arm occupies its fourth position, the switch 13 closes and the switch 18 is opened thereby to disconnect the resistor from the motor circuit. Switches 14, 15 and 16 close automatically when the current traversing the coil of the current-limit relay that is connected to the preceding switch to close falls to a predetermined value, the circuits of the actuating coils of these switches being controlled by the switch 52. The gradual decrease in resistance in the series circuit of the motor and the gradual insertion of resistance in parallel to the motor have like effects in that the motor is accelerated. The circuit completed through the motor is diagrammatically illustrated in Fig. 7 of the drawing.

When the controller is in its fifth or final position, the coil 54 of switch 24 is shunted by a circuit which extends from the contact segment 31, which is connected to the positive side of the line, through contact member 30, conductor 61, switch 62, a portion of resistor 63, coil 54 and switch 52 to positive conductor 1. The switch 24 then opens to insert the resistor 22 in series with the shunt field magnet winding 4 and thereby further accelerate the motor. The motor then operates at its normal speed with the entire series resistor 9 short circuited, the entire parallel resistor 17 out of circuit with the armature and with a weakened magnetic field, as is diagrammatically illustrated in Fig. 8 of the drawing.

When the controller is operated toward the "off" position, the shunt circuit for the coil 54 is opened and the switch 24 closes to shunt the field resistor 22 and thereby strengthen the magnetic field of the motor. The actuation of the controller to its third position opens the circuit of the actuating coil of the switch 13 and the latter opens to break the circuit of the actuating coil of switch 14. The switches 14, 15 and 16 open successively to insert the corresponding sections of the resistor 9 in series with the motor. The motor speed is correspondingly decreased by the changes in the resistance of the field circuit and armature circuit.

The opening of the switch 13 permits the closing of a mechanically actuated switch 63 to complete the circuit of the actuating coil of switch 18 and the latter closes to again connect the resistor 17 in parallel to the motor armature. The further actuation of the controller toward its "off" position operates to open the circuit of the actuating coil of the switch 12 and a switch 64 that is mechanically connected thereto completes a circuit for the actuating coil of the switch 19 and the latter closes to short circuit the corresponding section of the resistor 17. The switch 11 then opens to effect the closing of the switch 20 in a similar manner and a second section of the resistor 17 is shunted.

The gradual insertion of the series resistor 9 and the shunting of the parallel connected resistor 17 operate to materially decrease the speed of the motor by reason of the increased resistance of the armature circuit and the establishment of a low resistance shunt circuit or dynamic braking circuit for the motor. In practice, the controller handle will be held in this position until the motor has been retarded to a uniform speed corresponding to the circuit conditions then obtaining.

When the controller arm is in its "off" position, the circuit of the coil 40' is opened at one of the contact members 30 and the reversing switches 5 and 7 open the armature circuit of the motor. The switch 52, which is mechanically connected to the switches 5 and 7 opens to break the circuit of the actuating coils of switches 18, 19 and 20 and the latter open to disconnect the resistor 17 from the motor armature. The opening of the switch 52 breaks the circuit of the coil 54 and the latter is deënergized to permit the opening of switch 24 to insert the resistor 22 in circuit with the field winding 4. The opening of switch 52 operates also to break the circuit of the brake-releasing coil 53. The deënergizing of the coil 53 is delayed by reason of the shunt circuit connecting its terminals. The operation of the mechanical brake is thus deferred to occur substantially simultaneously with the bringing of the armature to rest to hold the armature stationary. The opening of the switch 5 operates to close switch 26 and to thereby complete a circuit which extends from the positive brush of the motor through switch 27, series holding coil 65, dynamic braking resistor 25, actuating coil of switch 23, series holding coil 66 and switch 26, to the negative brush of the motor. The switch 23 is closed by the circuit thus established to shunt the field resistor 22 and thereby provide a strong magnetic field for the motor during the final period of dynamic braking. The circuit completed through the motor is diagrammatically illustrated in Fig. 9 of the drawing.

Current generated by the motor armature flows through the dynamic braking circuit and the coils 65 and 66 are energized to hold the switches 26 and 27 tightly closed. The motor is then brought quickly and safely to rest. When current ceases to traverse the dynamic braking circuit, the coil of switch 23 is deënergized and the latter opens to insert the resistor 22 in series with the shunt field winding 4. The several circuits are then arranged for the succeeding starting operation.

When the controller handle is actuated in the opposite direction, the operation corresponds in every material respect to that described above since the contact members 29 are connected in parallel relation to the corresponding contact members 30. The reversing switches 6 and 8 operate to reverse the connections of the motor armature and the several switches for controlling the resistors 9 and 17 operate in the same manner as that described in connection with the rotation of the motor in the opposite direction.

Among other advantages possessed by the system above described, it may be noted that separate unit switches are provided for securing a gradual dynamic braking action for retarding the motor. The dynamic braking action during the acceleration of the motor is controlled by current-limit devices which operate in connection with means for controlling the starting resistor. The graduated dynamic braking action is secured entirely independently of the operation of the electromagnetic brake.

I claim as my invention:

1. In a motor-control system, the combination with an electric motor having an armature winding, a resistor in series relation to said winding, and a normally disconnected resistor in parallel relation to said winding, of means comprising a master switch and a plurality of electromagnetic switches for successively connecting said parallel-connected resistor and simultaneously shunting said series-connected resistor and inserting said parallel-connected resistor into circuit.

2. In a motor-control system, the combination with an electric motor having an armature winding, a resistor in series relation to said winding, and a resistor in parallel relation to said winding, of means for controlling said resistors, said means comprising a controller which, when actuated from a neutral position, operates to successively connect said parallel-connected resistor in parallel relation to said armature winding and to simultaneously shunt said series-connected resistor and gradually insert said parallel-connected resistor into circuit.

3. The combination with an electric motor having an armature and resistors in series and in parallel therewith, of a switch for controlling each of said resistors, and a switch mechanically connected to one of said controlling switches for controlling the other of said controlling switches.

4. The combination with an electric motor having an armature, a resistor in series therewith and a resistor in parallel therewith, of a normally open switch for controlling each of said resistors, actuating coils for closing said switches, and a switch mechanically connected to said series-resistor switch for opening the circuit of the coil of said parallel-resistor switch.

5. In a motor-control system, the combination with an electric motor having an accelerating resistor in series relation therewith, of dynamic braking means for said motor comprising a resistor in parallel relation thereto, means for simultaneously varying the effective portions of said resistors, reversing switches for said motor and means connected to said switches for establishing a local circuit comprising the motor armature and a third resistor.

6. In a motor-control system, the combination with an electric motor having an accelerating resistor in series circuit therewith, of dynamic braking means for said motor comprising a resistor in parallel relation thereto, means for simultaneously varying the effective portions of said resistors, reversing switches for said motor, means connected to said switches for establishing a local circuit comprising the motor armature and a third resistor, and means for controlling the field excitation of said motor.

7. In a motor-control system, the combination with an electric motor, and a resistor in parallel relation to the armature of said motor, of a reversing switch for said motor, and means controlled by said reversing switch for varying the effective portion of said resistor.

8. In a motor-control system, the combination with an electric motor, and a resistor in parallel relation to the armature of said motor, of a reversing switch for said motor, a controller, and means controlled by said controller and said reversing switch for varying the effective portion of said resistor.

9. In a motor-control system, the combination with an electric motor, and a resistor in parallel relation to the armature of said motor, of a reversing switch for said motor, and means controlled by said reversing switch for controlling the electrical connections of said resistor.

10. In a motor-control system, the combination with an electric motor, and a plurality of resistors connected, respectively, in series and in parallel relation to the motor armature, of a reversing switch for said motor, and means operable by said reversing switch for controlling the electrical connections of said resistors.

11. In a motor-control system, the combination with an electric motor, and a plurality of resistors connected, respectively, in series and in parallel relation to the motor armature, of a reversing switch for said motor, and means operable by said reversing switch for simultaneously opening the circuit of said parallel-connected resistor and closing the circuit of said series-connected resistor.

12. In a motor-control system, the combination with an electric motor, and a plurality of resistors connected, respectively, in series and in parallel relation to the motor armature, of a reversing switch for said motor, and means operable by said reversing switch for simultaneously opening the circuit of said parallel-connected resistor and completing a local circuit comprising the motor armature and said series-connected resistor.

13. In a motor-control system, the combination with an electric motor having a shunt field-magnet winding, of means for producing a relatively low degree of excitation of said winding during normal operation of the motor and during deceleration by shunting the motor armature and for producing a high degree of excitation of said winding when the motor is brought to rest by dynamic braking.

14. The combination with an electric motor having a resistor, a source of energy for said motor, and a switch for connecting said motor to said source, of a pair of switches for controlling said resistor, and a pair of switches mechanically connected to said connecting switch and each controlling one of said controlling switches.

15. The combination with an electric motor having armature and field-magnet windings, a resistor in circuit with each of said windings, and a switch for each of said resistors, of means for closing said field-resistor switch, means for closing said armature-resistor switch, and a switch mechanically connected to said armature-resistor switch for opening said field-resistor switch.

16. The combination with a source of energy, an electric motor having a shunt field-magnet winding connected to said source and an armature, and a switch for connecting said armature to said source and having an actuating coil, of a switch for closing the circuit of said coil and having an actuating coil in circuit with said winding.

17. The combination with an electric motor having armature and field-magnet windings, and a resistor in circuit with each of said windings, a source of energy for said motor, a switch for connecting said motor to said source, and a brake for said motor, of a switch connected to said connecting switch for controlling said resistors and said brake.

18. The combination with an electric motor having an armature, a resistor in series therewith, a resistor in parallel therewith, a dynamic-braking resistor, and a pair of reversing switches, of means for inserting said series resistor and said parallel resistor into circuit to decelerate said motor, and means for disconnecting said parallel resistor and means connected to said switches for connecting said armature and said dynamic-braking resistor in a local circuit to complete the deceleration of said motor.

In testimony whereof I have hereunto subscribed my name this 30th day of April, 1915.

HAROLD L. KEITH.